United States Patent
Sugimoto (10) Patent No.: US 11,138,716 B2
(45) Date of Patent: Oct. 5, 2021

(54) INSPECTION APPARATUS

(71) Applicant: ISHIDA CO., LTD., Kyoto (JP)

(72) Inventor: Kazuyuki Sugimoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/815,889

(22) Filed: Mar. 11, 2020

(65) Prior Publication Data
US 2020/0302590 A1 Sep. 24, 2020

(30) Foreign Application Priority Data
Mar. 19, 2019 (JP) .............................. JP2019-051638

(51) Int. Cl.
G06K 9/00 (2006.01)
G06T 7/00 (2017.01)
G01N 23/04 (2018.01)

(52) U.S. Cl.
CPC ............ *G06T 7/0002* (2013.01); *G01N 23/04* (2013.01); *G06T 2207/10116* (2013.01); *G06T 2207/30168* (2013.01)

(58) Field of Classification Search
CPC ......... G06T 7/0002; G06T 2207/10116; G06T 2207/30168; G01N 23/04
USPC ........................................................ 382/128
See application file for complete search history.

(56) References Cited

U.S. PATENT DOCUMENTS

| 5,049,748 | A | * | 9/1991 | Ito | ............................ | H05G 1/26 |
| | | | | | | 250/584 |
| 7,298,880 | B2 | * | 11/2007 | Nishiura | ............... | G06T 7/0012 |
| | | | | | | 128/922 |
| 9,791,591 | B2 | * | 10/2017 | Sugimoto | ............... | B65B 65/08 |
| 10,788,436 | B2 | * | 9/2020 | Tarumoto | .................. | G01T 1/24 |
| 2010/0002835 | A1 | | 1/2010 | Kabumoto et al. | | |
| 2017/0227477 | A1 | | 8/2017 | Sugimoto et al. | | |
| 2018/0321167 | A1 | * | 11/2018 | Tarumoto | .................. | G01T 1/24 |

FOREIGN PATENT DOCUMENTS

| JP | 2008026198 A | 2/2008 |
| JP | 2012073056 A | 4/2012 |
| JP | 2018155544 A | 10/2018 |
| WO | 2013069353 A1 | 5/2013 |
| WO | 2016024502 A1 | 2/2016 |

OTHER PUBLICATIONS

The extended European search report dated Sep. 4, 2020.

* cited by examiner

*Primary Examiner* — Jonathan S Lee
(74) *Attorney, Agent, or Firm* — Global IP Counselors, LLP (57) ABSTRACT

An X-ray inspection apparatus 1 includes a calculation unit that calculates a luminance conversion function of matching or approximating a first output value of a first element 11a based on a first transmission image G1 to a second output value of a second element 12a based on a second transmission image G2 of the second element disposed to face the first element 11a, for each of a plurality of the first elements 11a and a plurality of the second elements 12a; and a correction unit that corrects at least one of the first output value of each of the first elements 11a and the second output value of each of the second elements 12a based on the luminance conversion function calculated by the calculation unit.

4 Claims, 5 Drawing Sheets

INSPECTION APPARATUS

TECHNICAL FIELD

An aspect of the present invention relates to an inspection apparatus.

BACKGROUND

As an inspection apparatus in the related art, for example, there is known an inspection apparatus disclosed in Japanese Unexamined Patent Publication No. 2008-26198. The inspection apparatus disclosed in Japanese Unexamined Patent Publication No. 2008-26198 includes a transport conveyor that transports an object to be inspected in a predetermined direction; an X-ray irradiation unit that irradiates the object to be inspected, which is transported by the transport conveyor, with X-rays; a line sensor including a plurality of pixels that detect the X-rays, which are irradiated from the X-ray irradiation unit, through the transport conveyor; a determination unit that determines whether or not each position on the transport conveyor is a position suitable for performing a calibration of the line sensor, based on the result of detection of the X-rays irradiated from the X-ray irradiation unit, which is acquired at each position on the transport conveyor by the line sensor in a state where the object to be inspected is not placed on the transport conveyor; and a calibration execution unit that performs a calibration based on the detection result of the line sensor at the position that is determined to be a position suitable for performing a calibration by the determination unit.

SUMMARY

An improvement in the inspection accuracy of the inspection apparatus is required. Therefore, in recent years, so-called dual energy sensors which detect a plurality of energy bands are mounted in the inspection apparatus. In the inspection apparatus where the dual energy sensors are mounted, an increase in the sensitivities of the line sensors is considered so as to further improve the inspection accuracy. However, when the sensitivities of the line sensors are excessively increased, the line sensors may falsely detect non-foreign matter as foreign matter, and the inspection efficiency may decrease. For this reason, in the inspection apparatus, as described above, the calibrations of the line sensors are performed to correct a difference in sensitivity between the line sensors, and thus the inspection accuracy is improved. However, in the inspection apparatus where the dual energy sensors are mounted, there is a possibility that even when a difference in sensitivity between the pixels of each line sensor is corrected as in the related art, sufficient effects cannot be obtained.

An object of an aspect of the present invention is to provide an inspection apparatus of which the inspection accuracy is improved.

According to one aspect of the present invention, there is provided an inspection apparatus including a transport unit that transports an object; an irradiation unit that irradiates the object with an electromagnetic wave; a detection unit including a first detection unit that includes a plurality of first elements which detect the electromagnetic wave in a first energy band transmitted through the object, and a second detection unit that includes a plurality of second elements which detect the electromagnetic wave in a second energy band transmitted through the object and is disposed to face the first detection unit in a vertical direction or is disposed to face the first detection unit in a transport direction of the transport unit; a generation unit that generates a first transmission image based on the electromagnetic wave detected by each of the first elements and a second transmission image based on the electromagnetic wave detected by each of the second elements; a calculation unit that calculates a luminance conversion function of matching or approximating a first output value of the first element based on the first transmission image to a second output value of the second element based on the second transmission image of the second element disposed to face the first element, for each of the plurality of first elements and the plurality of second elements, or calculates a luminance conversion function of matching or approximating a first output value of a first element group including the plurality of first elements based on the first transmission image to a second output value of a second element group based on the second transmission image of the second element group including the plurality of second elements and disposed to face the first element group, for each of a plurality of the first element groups and a plurality of the second element groups; and a correction unit that corrects at least one of the first output value of each of the first elements or each of the first element groups and the second output value of each of the second elements or each of the second element groups based on the luminance conversion function calculated by the calculation unit.

In the inspection apparatus according to the one aspect of the present invention, the calculation unit calculates the luminance conversion function of matching or approximating the first output value of the first element to the second output value of the second element for each of the plurality of first elements and the plurality of second elements, or calculates the luminance conversion function of matching or approximating the first output value of the first element group to the second output value of the second element group for each of the plurality of first element groups and the plurality of second element groups. The correction unit corrects at least one of the first output value of each of the first elements or each of the first element groups and the second output value of each of the second elements or each of the second element groups based on the luminance conversion function calculated by the calculation unit. Accordingly, the inspection apparatus can correct a difference in sensitivity between the first element or the first element group and the second element or the second element group disposed to face the first element or the first element group. Namely, the inspection apparatus can correct a difference in sensitivity between each of pairs of elements (pixels) or element groups that are disposed to face each other in the vertical direction or the transport direction. For this reason, the luminance of the object in the first transmission image based on the first output value of the first element or the first element group is substantially matched to the luminance of the object in the second transmission image based on the second output value of the second element or the second element group, and thus the inspection apparatus can erase the object from the first transmission image and the second transmission image. Therefore, the inspection apparatus can detect foreign matter or the like contained in the object with high accuracy. As a result, the inspection accuracy of the inspection apparatus is improved.

According to one aspect, the generation unit may generate a plurality of the first transmission images and the second transmission images of at least one of a plurality of the objects different from each other and the objects of which positions are different from each other on the transport unit, and the calculation unit may calculate the luminance conversion function based on the plurality of first transmission images and the plurality of second transmission images. In this configuration, since the plurality of first transmission images and the plurality of second transmission images are used, it is possible to perform correction with higher accuracy.

According to one aspect, the correction unit may calculate a first luminance conversion function of matching or approximating the first output values of all of the first elements to each other based on the first transmission image that does not contain the object, and a second luminance conversion function of matching or approximating the second output values of all of the second elements to each other based on the second transmission image that does not contain the object, and the correction unit may correct a difference in sensitivity between all of the first elements and a difference in sensitivity between all of the second elements based on the first luminance conversion function and the second luminance conversion function that are calculated by the calculation unit. Accordingly, the inspection accuracy of the inspection apparatus is further improved.

According to one aspect of the present invention, the inspection accuracy is improved.

DETAILED DESCRIPTION

Hereinafter, a preferred embodiment of the present invention will be described in detail with reference to the accompanying drawings. Incidentally, in the description of the drawings, the same reference signs are assigned to the same or equivalent elements and duplicated descriptions will be omitted.

Figure 1:
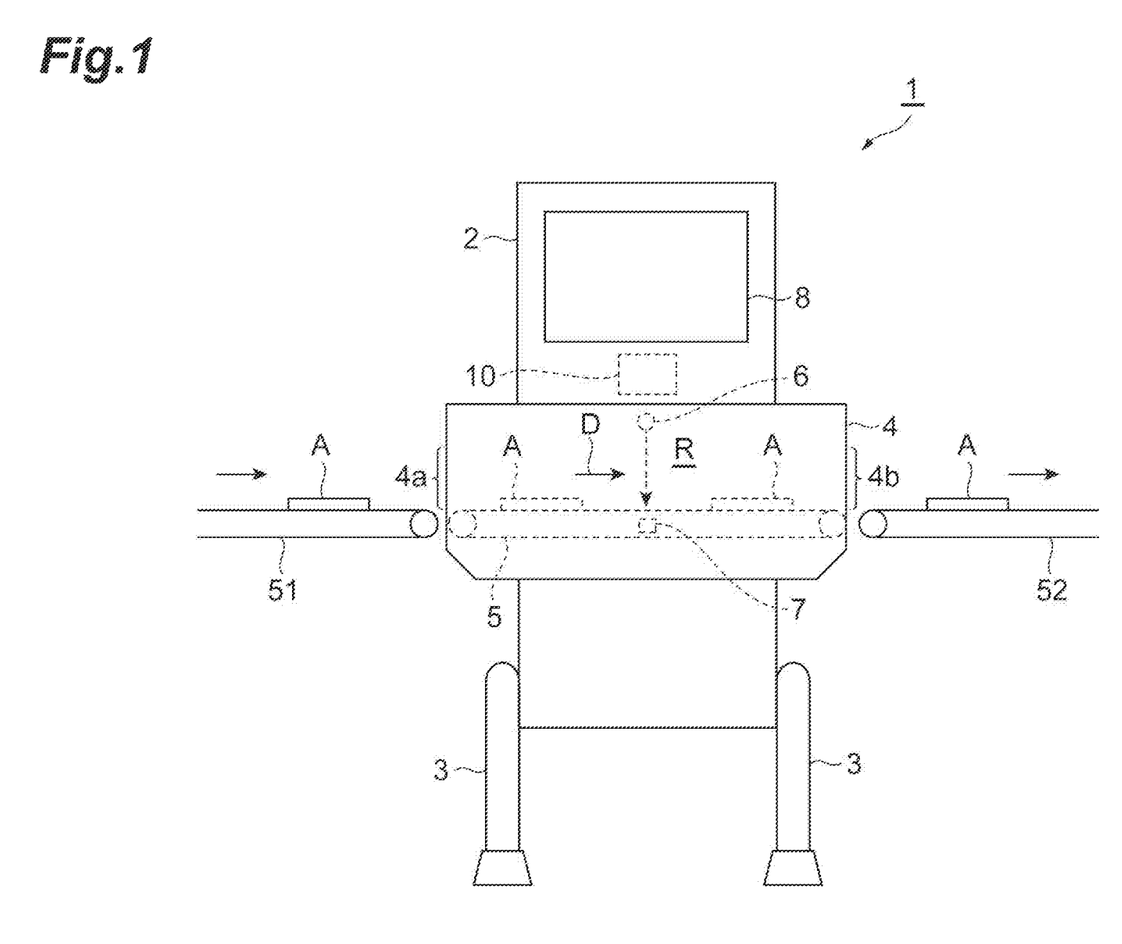
FIG. 1 is a configuration view of an X-ray inspection apparatus according to one embodiment.

As illustrated in FIG. 1, an X-ray inspection apparatus (inspection apparatus) 1 includes an apparatus main body 2, support legs 3, a shield box 4, a transport unit 5, an X-ray irradiation unit (irradiation unit) 6, an X-ray detection unit (detection unit) 7, a display operation unit 8, and a control unit (a generation unit, a calculation unit, and a correction unit) 10.

The X-ray inspection apparatus 1 generates an X-ray transmission image of an article A while transporting the article (object) A, and performs an inspection (for example, an inspection of the number of contained items, a foreign contaminant inspection, a missing item inspection, a crack inspection, or the like) on the article A based on the X-ray transmission image. The article A before inspection is entered into the X-ray inspection apparatus 1 by an entrance conveyor 51. The article A after inspection is exited from the X-ray inspection apparatus 1 by an exit conveyor 52. The article A which is determined to be a defective product by the X-ray inspection apparatus 1 is sorted out of a production line by a sorting apparatus (not illustrated) that is disposed downstream of the exit conveyor 52. The article A which is determined to be a good product by the X-ray inspection apparatus 1 passes through the sorting apparatus as it is.

The apparatus main body 2 accommodates the control unit 10 and the like. The support legs 3 support the apparatus main body 2. The shield box 4 is provided in the apparatus main body 2. The shield box 4 prevents X-rays from leaking outside. An inspection region R where an inspection of the article A is performed by X-rays is provided inside the shield box 4. An entrance port 4a and an exit port 4b are formed in the shield box 4. The article A before inspection is entered into the inspection region R from the entrance conveyor 51 through the entrance port 4a. The article A after inspection is exited from the inspection region R to the exit conveyor 52 through the exit port 4b. An X-ray shielding curtain (not illustrated) is provided in each of the entrance port 4a and the exit port 4b to prevent the leakage of X-rays.

The transport unit 5 is disposed inside the shield box 4. The transport unit 5 transports the article A from the entrance port 4a to the exit port 4b through the inspection region R along a transport direction D. The transport unit 5 is, for example, a belt conveyor that is suspended between the entrance port 4a and the exit port 4b.

Figure 2:
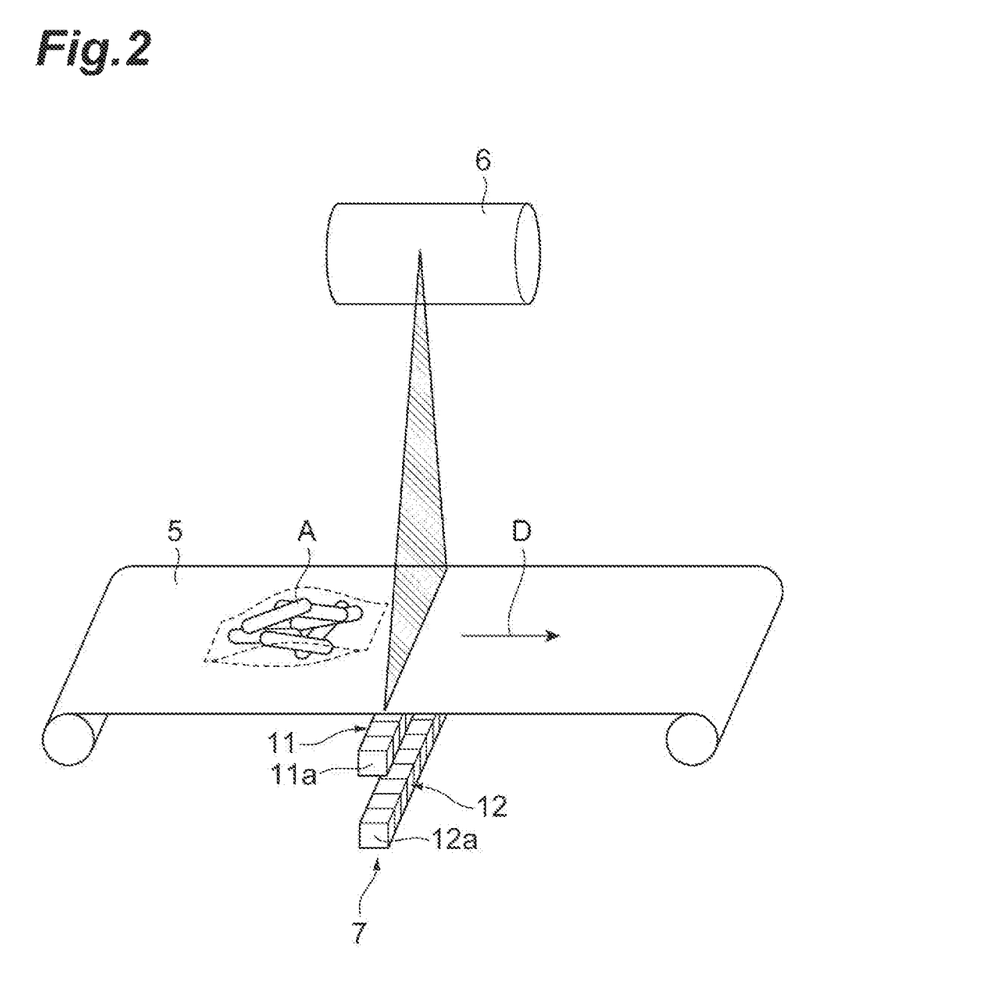
FIG. 2 is a configuration view of the inside of a shield box illustrated in FIG. 1.

As illustrated in FIGS. 1 and 2, the X-ray irradiation unit 6 is disposed inside the shield box 4. The X-ray irradiation unit 6 irradiates the article A, which is transported by the transport unit 5, with X-rays (electromagnetic waves). The X-ray irradiation unit 6 includes, for example, an X-ray tube that emits X-rays, and a collimator that spreads out the X-rays, which are emitted from the X-ray tube, in a fan shape in a plane perpendicular to the transport direction D.

The X-ray detection unit 7 is disposed inside the shield box 4. The X-ray detection unit 7 includes a first line sensor (first detection unit) 11 and a second line sensor (second detection unit) 12. The first line sensor 11 and the second line sensor 12 are disposed to face each other with a predetermined gap therebetween in a vertical direction perpendicular to the transport direction D.

The first line sensor 11 includes a plurality of first elements 11a that are one-dimensionally arranged along a horizontal direction perpendicular to the transport direction D. The first line sensor 11 detects X-rays in a low-energy band (first energy band) that are transmitted through the article A and a transport belt of the transport unit 5. The second line sensor 12 includes a plurality of second elements 12a that are one-dimensionally arranged along the horizontal direction perpendicular to the transport direction D. The second line sensor 12 detects X-rays in a high-energy band (second energy band) that are transmitted through the article A, the transport belt of the transport unit 5, and the first line sensor 11.

As illustrated in FIG. 1, the display operation unit 8 is provided in the apparatus main body 2. The display operation unit 8 displays various information and receives various condition inputs. The display operation unit 8 is, for example, a liquid crystal display, and displays an operation screen which is a touch panel. In this case, an operator can input various conditions via the display operation unit 8.

The control unit 10 is disposed inside the apparatus main body 2. The control unit 10 controls the operation of each part of the X-ray inspection apparatus 1. The control unit 10 includes a central processing unit (CPU), a read only memory (ROM), a random access memory (RAM), and the like. A result (first output value) of detection of the X-rays in a low-energy band from the first line sensor 11 of the X-ray detection unit 7 and a result (second output value) of detection of the X-rays in a high-energy band from the second line sensor 12 of the X-ray detection unit 7 are input to the control unit 10. The control unit 10 inspects, for example, whether or not the article A contains foreign matter, based on an image generated from the results of detection of the X-rays.

Figure 3A:
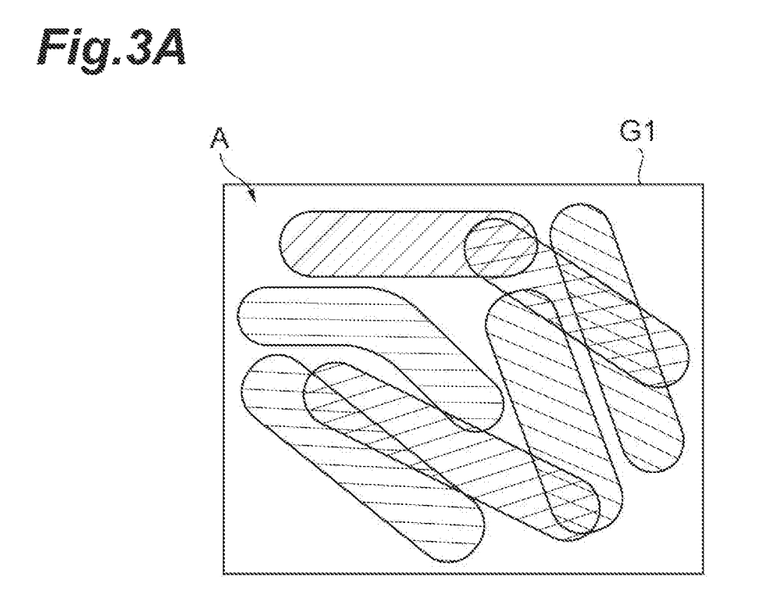
FIG. 3A is a view illustrating a transmission image.
Figure 3B:
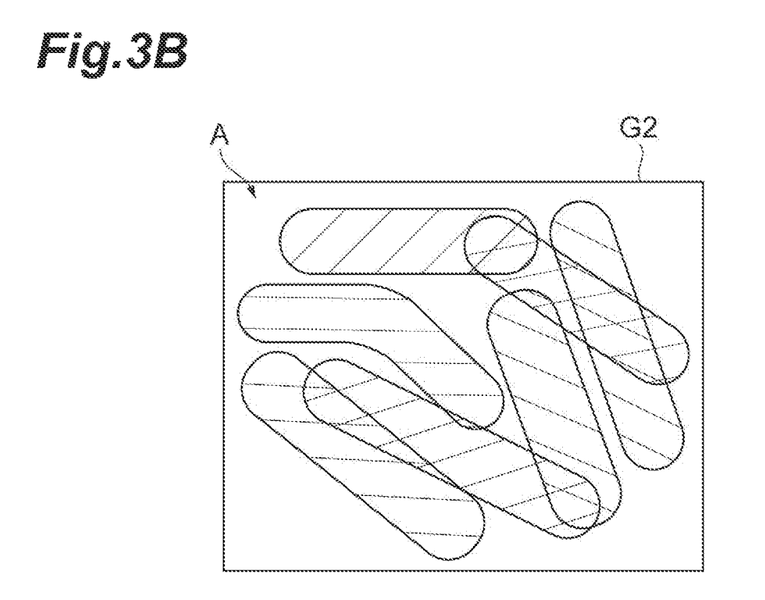
FIG. 3B is a view illustrating a transmission image.

The control unit 10 generates transmission images based on the detection results of the first line sensor 11 and the second line sensor 12. As illustrated in FIG. 3A, the control unit 10 generates a first transmission image G1 based on the result of detection of the X-rays in a low-energy band by the first line sensor 11. The first transmission image G1 has relatively high contrast and is dark overall. As illustrated in FIG. 3B, the control unit 10 generates a second transmission image G2 based on the result of detection of the X-rays in a high-energy band by the second line sensor 12. The second transmission image G2 has a relatively low contrast and is bright overall.

The control unit 10 calculates a luminance conversion function of matching or approximating the first output value of the first element 11a based on the first transmission image G1 to the second output value of the second element 12a based on the second transmission image G2 of the second element 12a disposed to face the first element 11a.

Figure 4A:
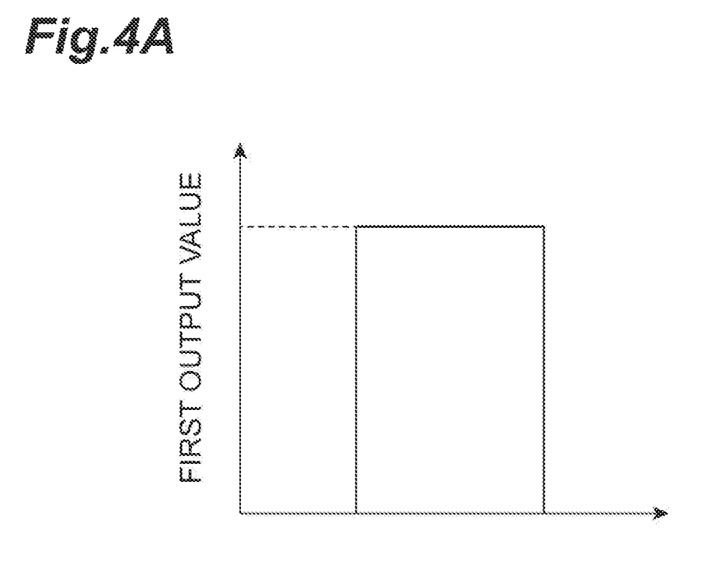
FIG. 4A is a graph showing one example of an average value of output values of one element based on the transmission image.
Figure 4B:
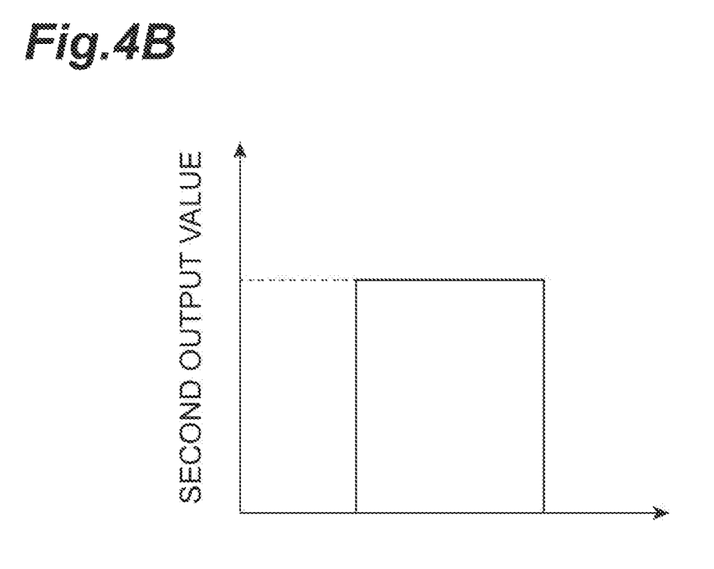
FIG. 4B is a graph showing one example of an average value of output values of one element based on the transmission image.

The control unit 10 calculates an average value of the first output values and an average value of the second output values. FIG. 4A is a graph showing one example of an average value of the first output values of one first element 11a based on the first transmission image G1, and FIG. 4B is a graph showing one example of an average value of the second output values of one second element 12a based on the second transmission image G2. In FIGS. 4A and 4B, the output value of the vertical axis is equivalent to a luminance value (detection intensity). The control unit 10 calculates a luminance conversion function of matching or approximating the average value of the first output values to the average value of the second output values. The control unit 10 calculates a luminance conversion function for each of the plurality of first elements 11a and the plurality of second elements 12a which are disposed to face each other.

The control unit 10 generates a plurality of the first transmission images G1 and the second transmission images G2 of a plurality of the articles A different from each other and the articles A of which the positions are different from each other on the transport unit 5. The articles A different from each other may be different types of the articles A or may be the same type of the articles A of which the shapes, dimensions, or the like are different from each other. The sentence that the positions of the articles A are different from each other on the transport unit 5 implies that the positions of the articles A are different from each other in the horizontal direction perpendicular to the transport direction D. It is preferable that the article A is placed at a plurality of positions on the transport unit 5 such that X-rays transmitted through the article A are detected by all of the first elements 11a and the second elements 12a. The control unit 10 calculates a luminance conversion function of matching or approximating the first output values of the first elements 11a based on the plurality of first transmission images G1 to the second output values of the second elements 12a based on the plurality of second transmission images G2.

The control unit 10 corrects the first output values of the first elements 11a based on the calculated luminance conversion function. Specifically, the control unit 10 corrects the first output values by multiplying the first output values of the first elements 11a by the luminance conversion function. Accordingly, the first output values of the first elements 11a are matched or approximated to the second output values of the second elements 12a.

In addition, the control unit 10 calculates a first luminance conversion function of matching or approximating the first output values of all of the first elements 11a to each other, based on the first transmission image G1 that does not contain the article A. The control unit 10 corrects the first output values of all of the first elements 11a based on the first luminance conversion function. The control unit 10 calculates a second luminance conversion function of matching or approximating the second output values of all of the second elements 12a to each other, based on the second transmission image G2 that does not contain the article A. The control unit 10 corrects the second output values of all of the second elements 12a based on the second luminance conversion function. The first transmission image G1 and the second transmission image G2 which do not contain the article A are images that are generated based on detection results of the first line sensor 11 and the second line sensor 12 after the transport unit 5 on which the article A is not placed is irradiated with X-rays.

Figure 5A:
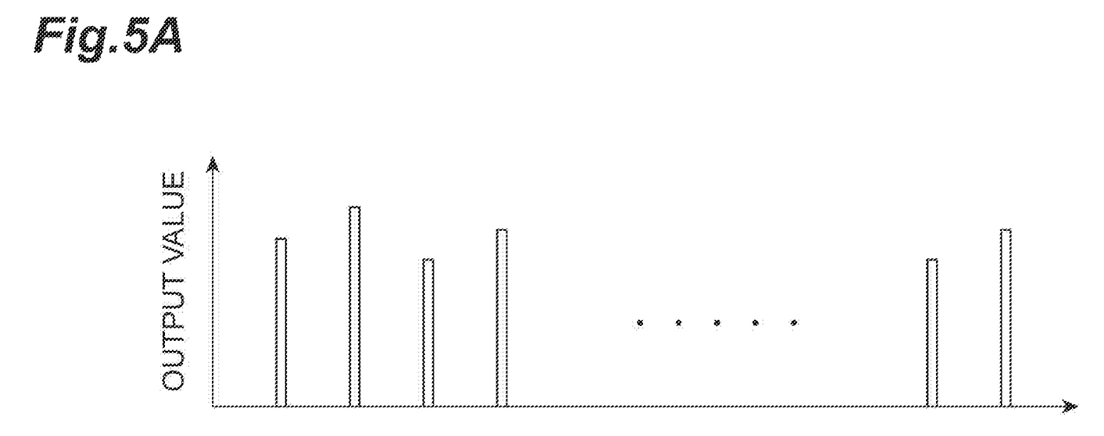
FIG. 5A is a graph for describing a correction to output values.
Figure 5B:
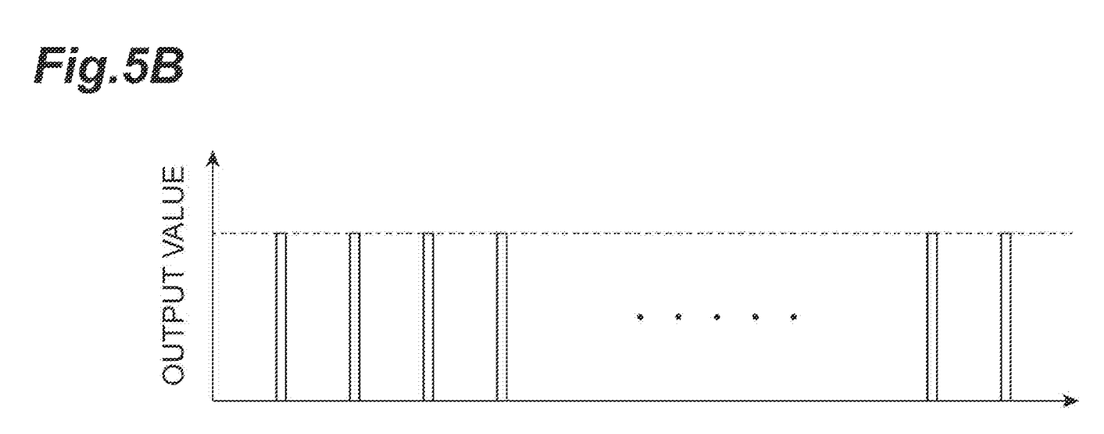
FIG. 5B is a graph for describing a correction to the output values.

Specifically, for example, the control unit 10 calculates the first luminance conversion function where the first output values which are detected and output by all of the first elements 11a as shown in FIG. 5A are equalized as shown in FIG. 5B. The control unit 10 calculates the second luminance conversion function where the second output values of all of the second element 12a also are equalized. The control unit 10 corrects the first output value of each of the first elements 11a and the second output value of each of the second elements 12a based on the first luminance conversion function and the second luminance conversion function.

As described above, in the X-ray inspection apparatus 1 according to the present embodiment, the control unit 10 calculates a luminance conversion function of matching or approximating the first output value of the first element 11a to the second output value of the second element 12a, for each of the plurality of first elements 11a and the plurality of second elements 12a. The control unit 10 corrects at least one of the first output value of each of the first elements 11a and the second output value of each of the second elements 12a based on the calculated luminance conversion function. Accordingly, the X-ray inspection apparatus 1 can correct a difference in sensitivity between the first element 11a and the second element 12a disposed to face the first element 11a. Namely, the X-ray inspection apparatus 1 can correct a difference in sensitivity between each of pairs of elements (pixels) that are disposed to face each other in the vertical direction. For this reason, the luminance of the article A in the first transmission image based on the first output value of the first element 11a is substantially matched to the luminance of the article A in the second transmission image based on the second output value of the second element 12a, and thus the X-ray inspection apparatus 1 can erase the article A from the first transmission image and the second transmission image. Therefore, the X-ray inspection apparatus 1 can detect foreign matter or the like contained in the article A with high accuracy. As a result, the inspection accuracy of the X-ray inspection apparatus 1 is improved.

In the X-ray inspection apparatus 1 according to the present embodiment, the control unit 10 generates the plurality of first transmission images G1 and second transmission images G2 of at least one of the plurality of articles A different from each other and the articles A of which the positions are different from each other on the transport unit 5. The control unit 10 calculates a luminance conversion function based on the plurality of first transmission images G1 and the plurality of second transmission images G2. In this configuration, since the plurality of first transmission images G1 and the plurality of second transmission images G2 are used, it is possible to perform correction with higher accuracy.

In the X-ray inspection apparatus 1 according to the present embodiment, the control unit 10 calculates the first luminance conversion function of matching or approximating the first output values of all of the first elements 11a to each other, based on the first transmission images G1 that do not contain the article A, and calculates the second luminance conversion function of matching or approximating the second output values of all of the second elements 12a to each other, based on the second transmission images G2 that do not contain the article A. The control unit 10 corrects the first output value of each of the first elements 11a and the second output value of each of the second elements 12a based on the calculated first luminance conversion function and the calculated second luminance conversion function. In this configuration, it is possible to correct differences in sensitivity between all of the first elements 11a, and differences in sensitivity between all of the second elements 12a. Accordingly, the inspection accuracy of the X-ray inspection apparatus 1 is further improved.

The embodiment of the present invention has been described above; however, the present invention is not limited to the embodiment, and various changes can be made without departing from the concept of the present invention.

In the embodiment, an aspect where the first line sensor 11 and the second line sensor 12 are disposed to face each other with the predetermined gap therebetween in the vertical direction perpendicular to the transport direction D has been described as an example. However, the first line sensor 11 and the second line sensor 12 may be disposed to face each other with the predetermined gap therebetween in the transport direction D.

In the embodiment, an aspect where the control unit 10 calculates a luminance conversion function of matching or approximating the first output values of the first elements 11a based on the plurality of first transmission images G1 to the second output values of the second elements 12a based on the plurality of second transmission images G2 has been described as an example. However, the control unit 10 may calculate a luminance conversion function of matching or approximating the first output values of the first elements 11a based on one first transmission image G1 to the second output values of the second elements 12a based on one second transmission image G2.

In the embodiment, an aspect where the control unit 10 corrects the first output value by multiplying the first output value of the first element 11a by a luminance conversion function has been described as an example. However, the control unit 10 may correct the second output value by multiplying the second output value of the second element 12a by a luminance conversion function. In addition, in the X-ray inspection apparatus 1, the control unit 10 may correct the first output value by multiplying the first output value of the first element 11a by a luminance conversion function, and correct the second output value by multiplying the second output value of the second element 12a by a luminance conversion function.

In the embodiment, an aspect where the control unit 10 corrects the first output value of each of the first elements 11a and the second output value of each of the second elements 12a based on the first luminance conversion function and the second luminance conversion function has been described as an example. However, the control unit 10 may not correct the first output value of each of the first elements 11a and the second output value of each of the second elements 12a.

In the embodiment, an aspect where the control unit 10 calculates a luminance conversion function of matching or approximating the average value of the first output values to the average value of the second output values has been described as an example. However, the control unit 10 may generate a histogram based on the first output values and a histogram based on the second output values, and calculate a luminance conversion function of matching or approximating the histogram of the first output values to the histogram of the second output values.

In the embodiment, an aspect where the control unit 10 calculates a luminance conversion function of matching or approximating the first output value of one first element 11a to the second output value of one second element 12a has been described as an example. However, the control unit 10 may calculate a luminance conversion function of matching or approximating the first output value of a first element group including the plurality of first elements 11a to the second output value of a second element group including the plurality of second elements 12a. Namely, the control unit 10 may calculate a luminance conversion function for each of units forming each line sensor. The first element group includes, for example, 128 first elements 11a, and the second element group includes, for example, 128 second elements 12a. The first line sensor 11 includes a plurality of the first element groups, and the second line sensor 12 includes a plurality of the second element groups. The control unit 10 calculates a luminance conversion function for each of the plurality of first element groups and the plurality of second element groups.

Specifically, for example, the control unit 10 calculates an average value of the first output values of the first element group and an average value of the second output values of the second element group. The control unit 10 calculates a luminance conversion function of matching or approximating the average value of the first output values to the average value of the second output values. For example, the control unit 10 corrects the first output values of the plurality of first elements 11a forming the first element group based on the calculated luminance conversion function. Accordingly, the X-ray inspection apparatus 1 can correct a difference in sensitivity between the first element group and the second element group disposed to face the first element group. For this reason, the luminance of the article A in the first transmission image based on the first output value of the first element group is substantially matched to the luminance of the article A in the second transmission image based on the second output value of the second element group, and thus the X-ray inspection apparatus 1 can erase the article A from the first transmission image and the second transmission image. Therefore, the X-ray inspection apparatus 1 can detect foreign matter or the like contained in the article A with high accuracy. As a result, the inspection accuracy of the X-ray inspection apparatus 1 is improved.

In the embodiment, an aspect where an inspection apparatus is the X-ray inspection apparatus 1 has been described as an example. However, the inspection apparatus is not limited to the X-ray inspection apparatus, and may be an inspection apparatus that performs an inspection of an article using electromagnetic waves. Namely, in the present invention, the electromagnetic waves may be X-rays, near-infrared rays, light, and other electromagnetic waves. In addition, the present invention is not limited to inspecting whether or not an article contains foreign matter, and on an article which accommodates contents such as food in a package such as a film packaging material and is shipped out, an inspection may be performed to determine whether or not the contents are caught by a sealing portion of the package, the contents in the package are damaged, foreign matter intrudes into the package, or the like. In addition, the types of articles are not specifically limited, and various articles can be inspection objects. Similarly, the type of foreign matter is not specifically limited, and various foreign matter can be inspection objects.

What is claimed is:

1. An inspection apparatus comprising:
a transport unit that transports an object;
an irradiation unit that irradiates the object with an electromagnetic wave;
a detection unit including a first detection unit that includes a plurality of first elements which detect the electromagnetic wave in a first energy band transmitted through the object, and a second detection unit that includes a plurality of second elements which detect the electromagnetic wave in a second energy band transmitted through the object and is disposed to face the first detection unit in a vertical direction or is disposed to face the first detection unit in a transport direction of the transport unit;
a generation unit that generates a first transmission image based on the electromagnetic wave detected by each of the first elements and a second transmission image based on the electromagnetic wave detected by each of the second elements;
a calculation unit that calculates a luminance conversion function of matching or approximating a first output value of the first element based on the first transmission image to a second output value of the second element based on the second transmission image of the second element disposed to face the first element, for each of the plurality of first elements and the plurality of second elements, or calculates a luminance conversion function of matching or approximating a first output value of a first element group including the plurality of first elements based on the first transmission image to a second output value of a second element group based on the second transmission image of the second element group including the plurality of second elements and disposed to face the first element group, for each of a plurality of the first element groups and a plurality of the second element groups; and
a correction unit that corrects at least one of the first output value of each of the first elements or each of the first element groups and the second output value of each of the second elements or each of the second element groups based on the luminance conversion function calculated by the calculation unit,
wherein the generation unit generates a plurality of the first transmission images and the second transmission images of at least one of a plurality of the objects different from each other and the objects of which positions are different from each other on the transport unit, and
the calculation unit calculates the luminance conversion function based on the plurality of first transmission images and the plurality of second transmission images.

2. The inspection apparatus according to claim 1,
wherein the correction unit calculates a first luminance conversion function of matching or approximating the first output values of all of the first elements to each other based on the first transmission image that does not contain the object, and a second luminance conversion function of matching or approximating the second output values of all of the second elements to each other based on the second transmission image that does not contain the object, and
the correction unit corrects the first output value of each of the first elements and the second output value of each of the second elements based on the first luminance conversion function and the second luminance conversion function that are calculated by the calculation unit.

3. An inspection apparatus comprising:
a transport unit that transports an object;
an irradiation unit that irradiates the object with an electromagnetic wave;
a detection unit including a first detection unit that includes a plurality of first elements which detect the electromagnetic wave in a first energy band transmitted through the object, and a second detection unit that includes a plurality of second elements which detect the electromagnetic wave in a second energy band transmitted through the object and is disposed to face the first detection unit in a vertical direction or is disposed to face the first detection unit in a transport direction of the transport unit;
a generation unit that generates a first transmission image based on the electromagnetic wave detected by each of the first elements and a second transmission image based on the electromagnetic wave detected by each of the second elements;
a calculation unit that calculates a luminance conversion function of matching or approximating a first output value of the first element based on the first transmission image to a second output value of the second element based on the second transmission image of the second element disposed to face the first element, for each of the plurality of first elements and the plurality of second elements, or calculates a luminance conversion function of matching or approximating a first output value of a first element group including the plurality of first elements based on the first transmission image to a second output value of a second element group based on the second transmission image of the second element group including the plurality of second elements and disposed to face the first element group, for each of a plurality of the first element groups and a plurality of the second element groups; and
a correction unit that corrects at least one of the first output value of each of the first elements or each of the first element groups and the second output value of each of the second elements or each of the second element groups based on the luminance conversion function calculated by the calculation unit,
wherein the correction unit calculates a first luminance conversion function of matching or approximating the first output values of all of the first elements to each other based on the first transmission image that does not contain the object, and a second luminance conversion function of matching or approximating the second output values of all of the second elements to each other based on the second transmission image that does not contain the object, and the correction unit corrects the first output value of each of the first elements and the second output value of each of the second elements based on the first luminance conversion function and the second luminance conversion function that are calculated by the calculation unit.

4. The inspection apparatus according to claim 3, wherein the generation unit generates a plurality of the first transmission images and the second transmission images of at least one of a plurality of the objects different from each other and the objects of which positions are different from each other on the transport unit, and the calculation unit calculates the luminance conversion function based on the plurality of first transmission images and the plurality of second transmission images.

* * * * *